US010271661B2

(12) United States Patent
DeFranks et al.

(10) Patent No.: US 10,271,661 B2
(45) Date of Patent: Apr. 30, 2019

(54) CUSHIONS INCLUDING FLAT SPRINGS

(71) Applicant: DREAMWELL, LTD., Las Vegas, NV (US)

(72) Inventors: Michael S. DeFranks, Decatur, GA (US); Rahul Kirtikar, Atlanta, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 279 days.

(21) Appl. No.: 14/528,439

(22) Filed: Oct. 30, 2014

(65) Prior Publication Data
US 2016/0120330 A1    May 5, 2016

(51) Int. Cl.
| | |
|---|---|
| *A47C 23/02* | (2006.01) |
| *A47C 7/02* | (2006.01) |
| *F16F 1/18* | (2006.01) |
| *F16F 3/00* | (2006.01) |
| *A47C 27/04* | (2006.01) |
| *B68G 9/00* | (2006.01) |
| *A47C 23/043* | (2006.01) |

(52) U.S. Cl.
CPC .............. *A47C 23/02* (2013.01); *A47C 7/025* (2013.01); *A47C 23/0438* (2013.01); *A47C 27/04* (2013.01); *B68G 9/00* (2013.01); *F16F 3/00* (2013.01)

(58) Field of Classification Search
CPC ... A47C 23/002; A47C 23/02; A47C 23/0438; A47C 27/04; A47C 27/06; A47C 27/065; A47C 23/12; A47C 23/125; A47C 23/15; A47C 23/155; A47C 7/02; A47C 7/025; F16F 1/18; F16F 3/00; B68G 9/00
See application file for complete search history.

(56) References Cited

U.S. PATENT DOCUMENTS

| | | | |
|---|---|---|---|
| 88,070 A * | 3/1869 | Partello | A47C 23/00 5/244 |
| 3,879,025 A * | 4/1975 | Dillard | F16F 1/02 267/165 |
| 5,785,303 A * | 7/1998 | Kutschi | A47C 23/00 267/103 |
| 6,170,808 B1 * | 1/2001 | Kutschi | A47C 27/065 267/107 |
| 6,595,503 B1 * | 7/2003 | Cheng | F16F 1/187 267/160 |

(Continued)

*Primary Examiner* — Nicholas F Polito
*Assistant Examiner* — Rahib T Zaman
(74) *Attorney, Agent, or Firm* — Cantor Colburn LLP

(57) ABSTRACT

Cushions include a chassis core, having a rigid or semi-rigid base sheet; and a plurality of paired flat springs coupled to the rigid or semi-rigid base sheet, wherein each paired flat spring comprises a lower flat spring including a first terminal end, a second terminal end, and a flexible arcuate member extending from the first terminal end to the second terminal end, and an upper flat spring including a first terminal end, a second terminal end, and a flexible arcuate member extending from the first terminal end to the second terminal end, wherein the first and second terminal ends of the upper flat spring are fixedly attached to respective first and second terminal ends of the lower flat spring such that the upper flat spring is inverted relative to the lower flat spring. Also disclosed are processes for manufacturing the core chassis.

9 Claims, 4 Drawing Sheets

(56) References Cited

U.S. PATENT DOCUMENTS

| | | | |
|---|---|---|---|
| 2009/0133195 A1* | 5/2009 | Elzenbeck | A47C 27/065 5/718 |
| 2013/0096887 A1* | 4/2013 | Fee | G06F 17/5009 703/1 |
| 2015/0216317 A1* | 8/2015 | DeFranks | A47C 27/065 5/719 |
| 2015/0308533 A1* | 10/2015 | DeFranks | A47C 27/065 5/690 |

* cited by examiner

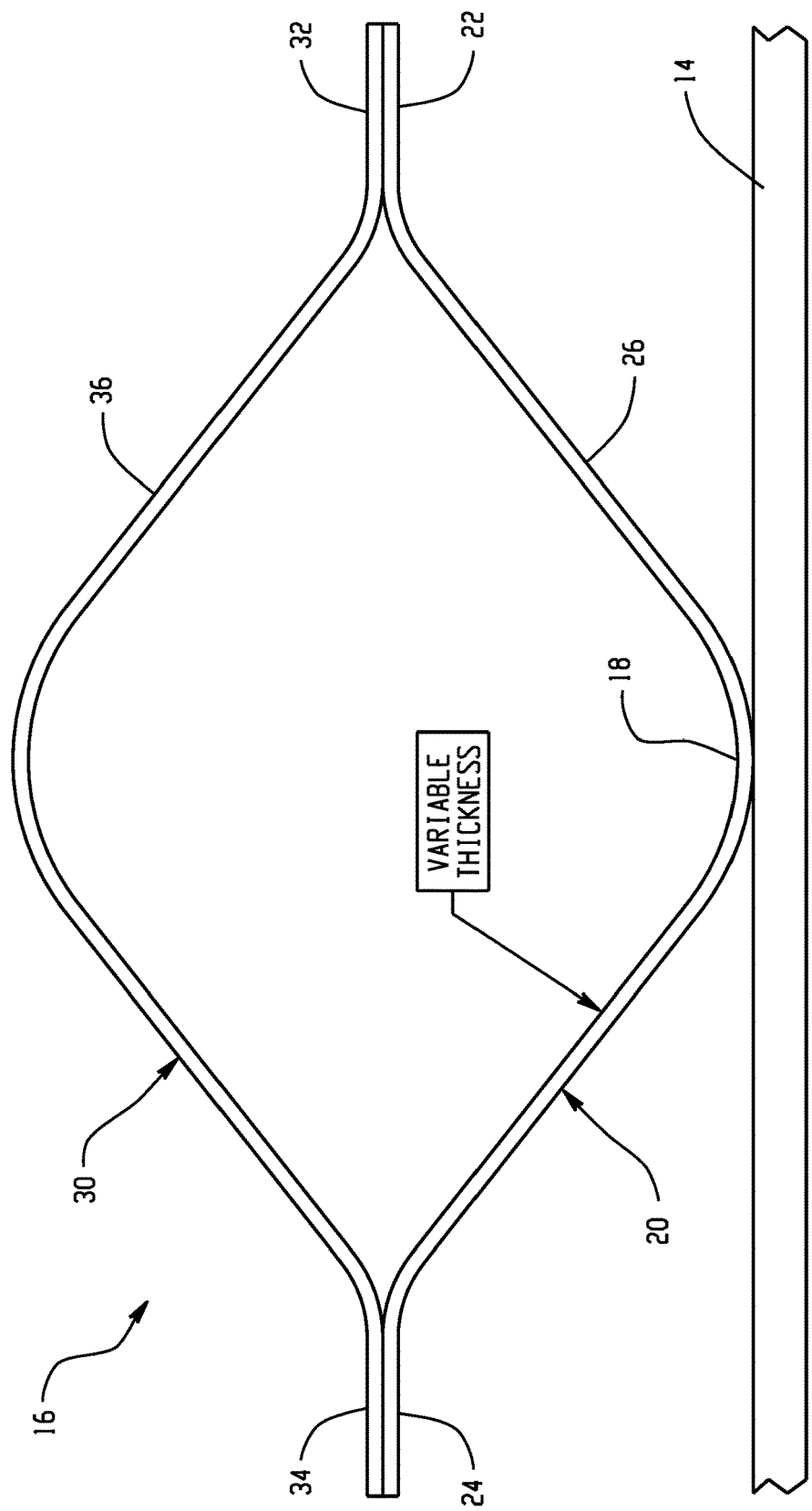

CUSHIONS INCLUDING FLAT SPRINGS

BACKGROUND

The present disclosure generally relates to spring cushions and more particularly, to spring cushions including flat springs to provide resilient support to a user thereof to enhance the comfort of the cushion. The flat springs generally have an arcuate shape, e.g., an elliptical or parabolic shape and are paired to provide vertical displacement.

Various constructions of cushions for use in seating, sofas, mattresses, and the like have evolved very little in the past fifty years. For example, a standard mattress generally includes a set of metal coil springs mounted either on a base under a foam pad, or sandwiched between a pair of foam pads. The metal springs and foam pad or pads are then covered with a batting material. The entire structure is then sewn into a cloth cover and the edges are wrapped and sewn.

The limitations of metal coil spring mattresses combined with improved quality and durability of foam products has led to the relatively recent development of the foam core mattress as a viable alternative to the coil spring mattress. A foam core mattress can provide significant improvements in body contour, elimination of pressure points, and improved comfort and support compared to conventional spring-based mattresses. A basic foam mattress typically includes one or more layers of foam having desirable properties assembled into a fabric cover which often appears identical to a standard coil metal spring mattress. A foam mattress may include a center core of relatively high resilience foam sandwiched between two layers of lower resilience foam encased in a fabric shell. This construction allows for a reversible mattress.

While foam cushions such as the mattress described above overcome some of the disadvantages of coil spring cushions, they can exhibit other disadvantages including excessive firmness, difficulty adjusting the firmness, and a lack of air flow through the foam core trapping body heat within the cushion. There is, therefore, a continuing need for improved cushion designs overcoming the disadvantages of coil spring and foam cushions.

BRIEF SUMMARY

Disclosed herein are cushions including a core chassis comprising a plurality of flat springs and processes for manufacturing the cushions.

In one embodiment, a cushion comprises a core chassis including a rigid or semi-rigid base sheet; and a plurality of paired flat springs. Each paired flat springs includes a first flat spring including a first terminal end, a second terminal end, and a flexible arcuate member extending from the first terminal end to the second terminal end, and a second flat spring including a first terminal end, a second terminal end, and a flexible arcuate member extending from the first terminal end to the second terminal end, wherein the first and second terminal ends of the second flat spring are fixedly attached to respective first and second terminal ends of the first flat spring, and the first flat spring is fixedly attached to the rigid or semi-rigid base sheet at about a midpoint of the flexible arcuate member. In one embodiment, the plurality of paired flat springs are arranged in rows and columns on the rigid or semi-rigid base sheet, wherein the paired flat springs are arranged in the rows and columns such that each paired flat spring is perpendicularly relative to an adjacent paired flat spring. In other embodiments, the plurality of paired flat springs are arranged in rows and columns on the rigid or semi-rigid base sheet, wherein the plurality of paired flat springs are arranged in rows and columns on the rigid or semi-rigid base sheet such that every other paired flat spring is aligned at a 30 to 90 degree offset relative to an adjacent paired flat spring.

A process for manufacturing a core chassis for a cushion comprises providing a sheet; forming one or more lower flat springs in the sheet, each lower flat spring having first and second arcuate members extending from and continuously joined to the sheet with each arcuate portion having a terminal end; and attaching an upper flat spring to the lower flat spring, the upper flat spring comprising a first terminal end, a second terminal end, and a flexible arcuate member extending from the first terminal end to the second terminal end, wherein the first and second terminal ends are coupled to the terminal ends of the lower flat spring.

In another embodiment, a cushion comprises a core chassis comprising: a rigid or semi-rigid base sheet; and one or more paired flat springs integral to the rigid or semi-rigid base sheet, wherein each paired flat spring comprises a lower arcuate member and an upper arcuate member inverted relative to the lower arcuate member, wherein the lower arcuate member includes a portion integral with the rigid or semi-rigid base sheet, wherein terminal ends corresponding to the lower and upper arcuate members are integral to one another. In other embodiments, each paired flat spring comprises a pair of lower arcuate members and an upper arcuate member therebetween inverted relative to the lower arcuate members, wherein each of the lower arcuate members includes a portion integral with the rigid or semi-rigid base sheet.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike:

FIG. 2 depicts a plan view of a paired flat spring in accordance with the present disclosure.

DETAILED DESCRIPTION

Figure 1:
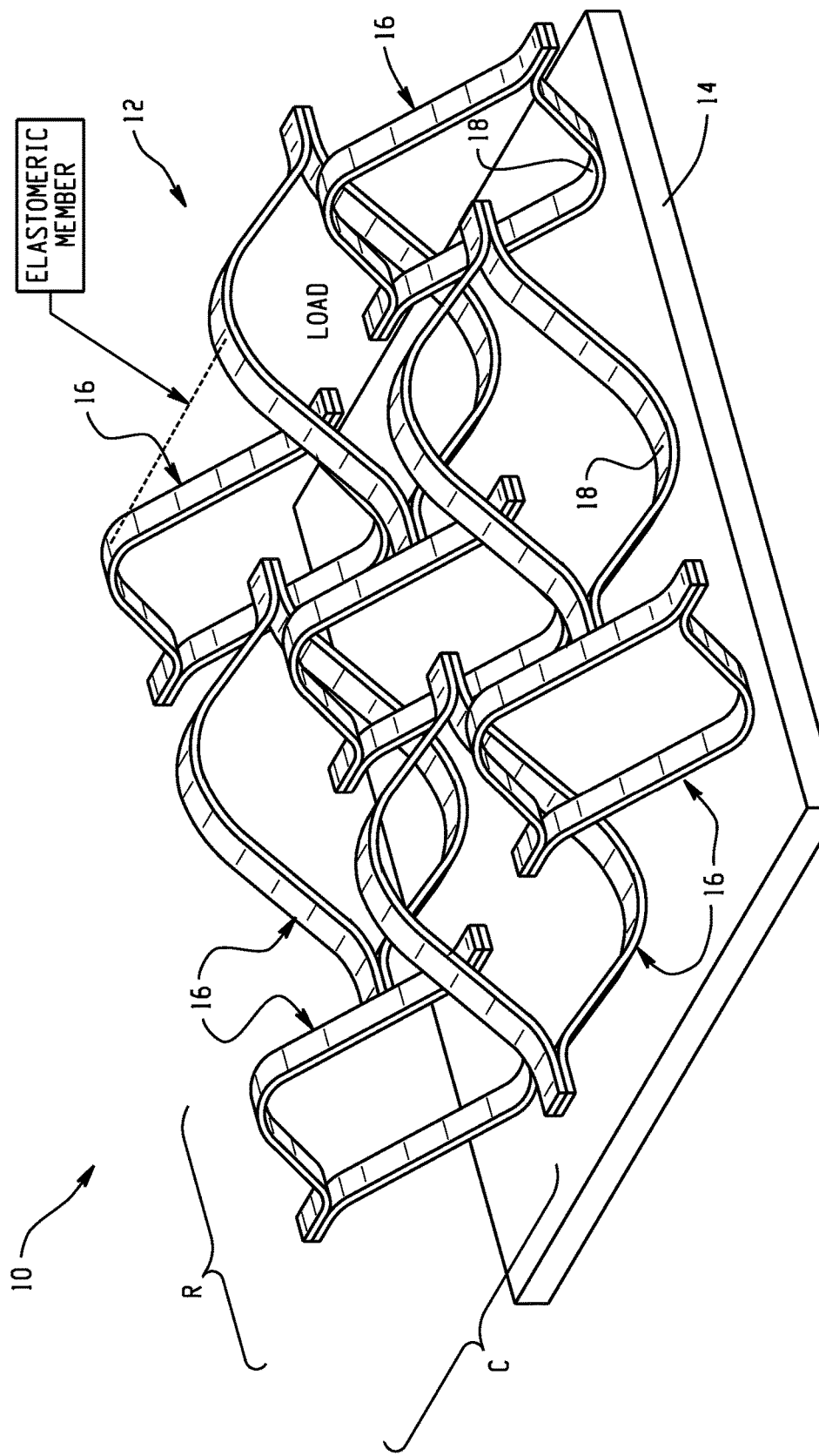
FIG. 1 depicts a partial perspective view of a chassis core for a mattress in accordance with the present disclosure.

Referring now to FIGS. 1-2, there is shown various partial views of a one sided cushion assembly generally designated by reference numeral 10. The cushion assembly 10 generally includes a core chassis 12 comprising a rigid or semi-rigid base sheet 14 and a plurality of paired flat springs 16 anchored at about a midpoint 18 of a selected one of the flat springs in the paired flat springs to the rigid base sheet 14. As shown, the plurality of paired flat springs 16 are arranged in columns (C) and rows (R) on the rigid or semi-rigid base sheet 16, wherein the columns and rows are arranged such that each paired flat spring is generally perpendicularly oriented relative to an adjacent paired flat spring within the row and column. In other embodiments, the columns and rows of paired flat springs are arranged such that the paired flat springs are oriented with a 30 to 90 degree offset relative to an adjacent paired flat spring As shown more clearly in FIG. 2, each of the paired flat springs 16 shown includes a lower spring 20 including a first terminal end 22, a second terminal end 24, and a flexible arcuate member 26 extending from the first terminal end 22 to the second terminal end 24; and an upper flat spring 30 including a first terminal end 32, a second terminal end 34, and a flexible arcuate member 36 extending from the first terminal end 32 to the second terminal end 34. The terminal ends 22, 24, 32, 34 are generally horizontally oriented relative to the rigid or semi-rigid base sheet 14. The lower flat spring 20 is fixedly attached to the rigid or semi-rigid base sheet 14 at about an arc midpoint 18 of the flexible arcuate member 26. The upper flat spring 30 is inverted relative to the lower flat spring 20, wherein the first and second terminal ends 32, 34 respectively, of the second flat spring 30 are fixedly attached to the respective first and second terminal ends 22, 24 of the first flat spring 20. In this manner, application of a load to the pair flat spring 16 provides vertical displacement.

Attachment of the respective terminal ends of paired flat springs 16 as well as attachment of the lower flat spring 20 to the base sheet 14 can be effected by use of an adhesive, crimping, welding, taping, brazing, nut and bolt, pins, a rivet, a clamp, hook and loop fasteners, ties, screw anchor, combinations thereof, or the like. The particular means for attachment are not intended to be limited. In other embodiments, the paired flat springs may be formed from the sheet material such that the paired flat springs have no direct attachment points but are instead integral to the base sheet, e.g., embodiments depicted in FIGS. 3A, 3B, 4A and 4B discussed in greater detail below Each of the flat springs 20, 30 in the illustrated paired flat spring has a similar arcuate shape. However in some embodiments, the arcuate shape of the paired flat springs 20, 30 may be different provided the respective terminal ends 22, 32 and 24, 34 can be attached to one another, i.e., the degree of curvature between terminal ends may be different. In view of the foregoing, it should be apparent that the present disclosure is not intended to limit the paired flat springs to any specific arcuate and/or geometric shape. For example, the arcuate shape of the flat springs may be elliptically shaped, parabolically shaped, and the like. Likewise, in some embodiments, the flat springs may be asymmetric meaning that the curvature, thickness, and/or length may be different for each portion of the flat spring extending from the mounting point 18 relative to the other portion. In a similar manner, the rigid or semi-rigid base sheet 14 from which the flat springs are attached are not intended to be limited to a rigid or semi-rigid sheet so long as the flat springs are supported and effective to provide load support to each of the paired flat springs. For example, in some embodiments, mounting rails can be employed, wherein the mounting rails are attached to a frame.

As noted above, the paired flat springs 16 are arranged in a repeating pattern, wherein the plurality of paired flat springs are spaced apart from one another and arranged in rows and columns on the rigid or semi-rigid base sheet such that each paired flat spring is perpendicularly relative to an adjacent paired flat spring as shown or oriented with a 30 to 90 degree offset relative to an adjacent paired flat spring. The pattern defined by the relationship between the first row and the adjacent row or first column to an adjacent column is repeated to approximate the length and width dimensions intended for the cushion assembly. For example, the core chassis of the cushion assembly may be configured for a mattress application and have dimensions desirable to form twin, full or double, queen and king size mattresses. Although these particular mattresses are generally standardized in the United States in accordance with the International Sleep Products Association Voluntary Dimensional Guidelines for Bedding Product published in 2001, it should be apparent that the mattress can be configured in nonstandard sizes such as, for example, extra-long (XL) versions of the above as well as the different standard and custom sized mattresses employed in countries outside of the United States. Moreover, each twin, full, queen, king full sized mattress can vary individually in terms of size, typically on the order of a few inches.

In this manner, when arranged in rows and columns as previously described, the core chassis provides vertical displacement, relatively small distances between adjacent support points as generally defined by the apex of the arcuate members in the upper flat springs 30, which results in less bridging; eliminates moment loading of connection points; and eliminates upholstery layer pinching compared to other cushioning devices; among others.

The cushion assembly including the core chassis may include additional layers suited for the intended application. For example, in mattress applications the cushion may further include a side rail assembly, one or more topper layers, one or more base layers, ticking, upholstery and/or quilting layers, and the like. The side rail assembly, topper layers and/or base layers may be composed of multiple foam layers or of a unitary foam layer. Suitable materials include a variety of plastics and reinforced plastics but more commonly polyurethane foam or polyethylene foam.

Each flat spring within the paired flat spring construction can be formed of a single flexible material that has a substantially rectangular cross section; although, the substantially rectangular cross section may dimensionally vary from one end of the arcuate shaped flat spring to the other end of the arcuate flat spring. Suitable flexible materials include various metals, plastics such as fiber reinforced plastic, e.g., glass fibers/epoxy, carbon epoxy, and the like. Desirably, the material is lightweight for ease in handling. The spring dimensions and material selection will generally depend on the intended application and desired spring rate. Although the height of the paired flat spring without a load is not intended to be limited and is generally dependent on the intended use, in some embodiments, the paired flat spring without a load should provide a height of about 2 inches to about 24 inches. In other embodiments, the paired flat spring without a load should provide a height of 4 to 10 inches; and in still, other embodiments, paired flat spring without a load should provide a height of 4 to 8 inches. The material, dimensions, and mechanical properties of the flat springs should be selected such that the springs do not bottom out upon a typical application load (e.g., while seated or laying down on the cushion).

Optionally, a paired flat spring within the core chassis may include an elastic interconnect attached at about an apex of the upper flat spring to one or more adjacent paired flat springs. By way of example, the elastic interconnect may be an elastic band. The elastic interconnect can further tailor the spring behavior as may be desired in some applications.

The base sheet 14 can be rigid or semi-rigid. Some flexibility may be desired in some embodiments to permit ease in handling the cushion such as may be desirable when transporting the cushion from one location to another, e.g., navigating a cushion the form of a mattress through narrow corridors with ninety degree turns or when in use with adjustable foundation bases. The base sheet can be made of any material including but not limited to plastic, wood, metal, combinations thereof, and the like.

In one embodiment, the lower flat springs are stamped from the base sheet. Typically, the sheet is fed into an automated die, often a progressive die that can take in feedstock via roll, sheets, or the like, punch and bend the stock. The lower flat springs are then formed from the partially punched-out sections in the sheet member. In this method, the lower flat springs are integrally formed into the assembly and welding or other joining process is avoided. Further, the mechanical connection between the plate and the lower flat spring arises from the spring being a ribbon of plate and therefore continuously joined to the plate, making for a robust connection with the plate. Alternatively, a sheet member may be molded or otherwise formed of another material such as plastic. In certain embodiments, alternate processing steps may be inserted into the process. For example, if the sheet members or springs are to be coated with protective material, the coating process may occur at any stage prior to or after final assembly of the core chassis it should be apparent that multiple springs can be formed in each sheet. Alternatively, individual flat springs with the same or different properties can be formed, collectively arranged to form a paired flat spring construction, and attached onto the base sheet.

Figure 3A:
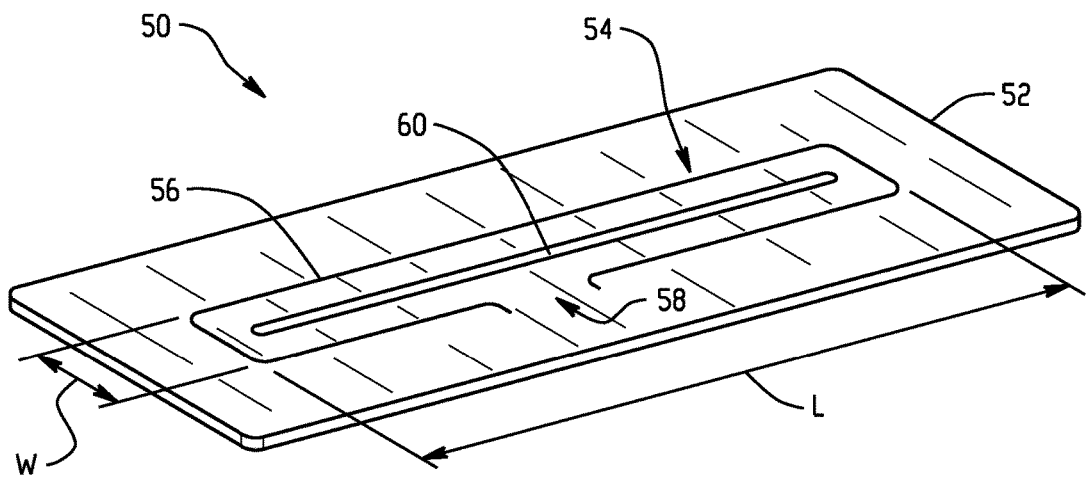
FIG. 3A depicts a perspective view of a flat spring formed from a sheet material before and after the flat spring is shaped, wherein the flat spring has a single attachment point to the sheet material in accordance with an embodiment of the present disclosure.
Figure 3B:
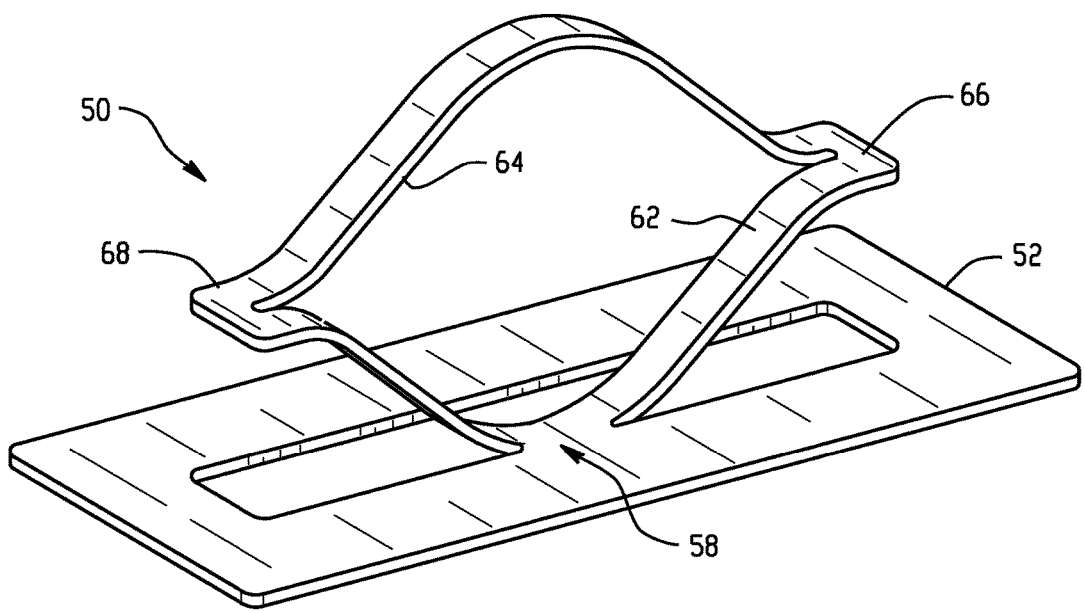
FIG. 3B also depicts a perspective view of a flat spring formed from a sheet material before and after the flat spring is shaped, wherein the flat spring has a single attachment point to the sheet material in accordance with an embodiment of the present disclosure.

In another embodiment as shown in FIGS. 3A and 3B, a cushion assembly may include one or more paired flat springs generally designated by reference numeral 50 can be stamped from a base sheet 52. For ease in discussion, one paired flat spring is shown. However, it should be apparent to those skilled in the art that a plurality of paired flat springs can be formed in a similar manner and with orientations similar to that discussed in relation to FIG. 1.

FIG. 3A depicts the stamped base sheet prior to shaping of the paired flat spring and FIG. 3B depicts the paired flat spring after the paired flat spring is shaped. As shown in FIG. 3A, a pattern 54 stamped into the base sheet 52 defines a generally rectangular-shaped outer perimeter 56 having a non-stamped portion 58 corresponding to an arc midpoint integral to the base sheet 52. The generally rectangular-shaped outer perimeter 56 includes a length dimension L and a width dimension W, wherein the length dimension is greater than the width dimension. The pattern 54 further includes a slit or a slot opening 60 that extends lengthwise within the rectangularly shaped perimeter and generally bisects the width dimension.

As shown in FIG. 3B, the paired flat spring 50 is formed by lifting the stamped pattern 54 from the base sheet in a perpendicular direction so as to define a lower arcuate member 62 and an upper arcuate member 64, wherein terminal ends 66, 68 of the lower and upper arcuate members are integral to one another. As in prior embodiments, the terminal ends 66, 68 are generally horizontally oriented relative to the base sheet 52. By way of example, the base sheet can be formed of a thermoplastic material and heated to effect shaping subsequent to stamping.

The lower arcuate member 62 is integral to the base sheet at arc midpoint 58 and the upper arcuate member 64 is inverted relative to the lower arcuate member 62. In this manner, application of a load to the pair flat spring 50 provides vertical displacement.

Figure 4A:
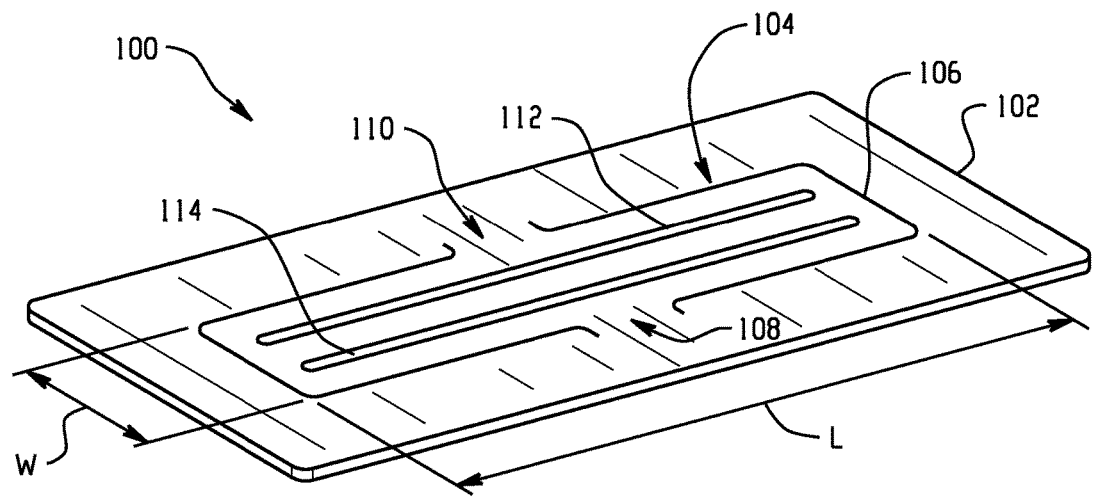
FIG. 4A depicts a perspective view of a flat spring formed from a sheet material before and after the flat spring is shaped, wherein the flat spring has two attachment points to the sheet material in accordance with an embodiment of the present disclosure.
Figure 4B:
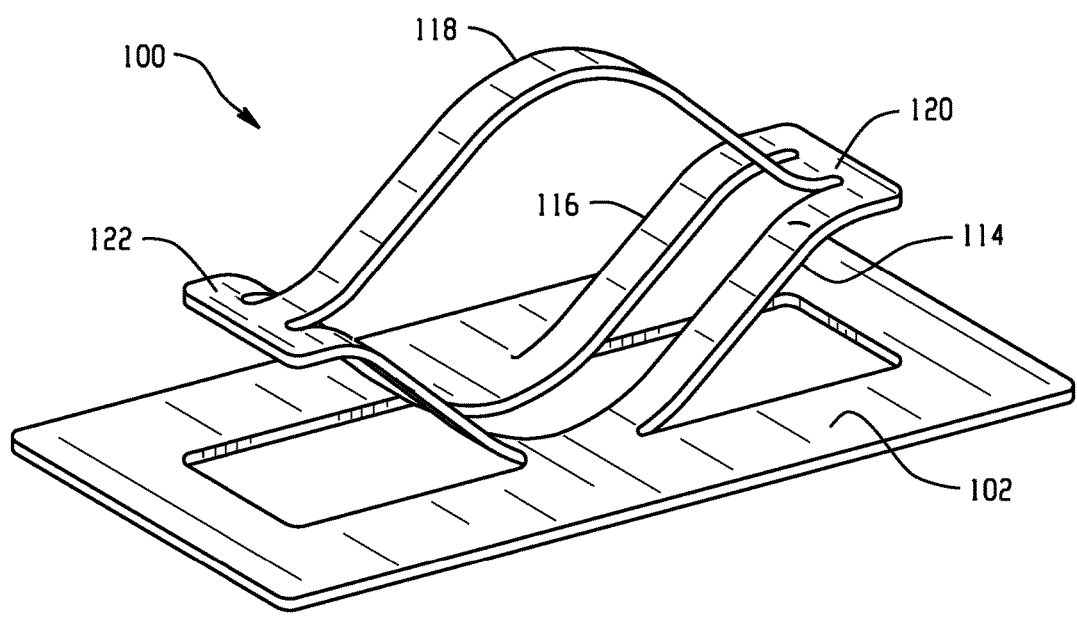
FIG. 4B also depicts a perspective view of a flat spring formed from a sheet material before and after the flat spring is shaped, wherein the flat spring has two attachment points to the sheet material in accordance with an embodiment of the present disclosure.

In another embodiment shown in FIGS. 4A and 4B, a cushion assembly may include one or more paired flat springs generally designated by reference numeral 100 are stamped from a base sheet 102. FIG. 4A depicts the stamped base sheet prior to shaping of the paired flat spring and FIG. 4B depicts the paired flat spring after the paired flat spring is shaped. As shown in FIG. 4A, a pattern 104 stamped into the base sheet 102 defines a generally rectangular-shaped outer perimeter 106 having two diametrically opposing non-stamped portions 108, 110 corresponding to arc midpoints integral to the base sheet 102. The generally rectangular-shaped outer perimeter 106 includes a length dimension L and a width dimension W, wherein the length dimension is greater than the width dimension. The pattern 104 further includes a pair of slits or slot openings 112, 114 that extends lengthwise within the rectangularly shaped perimeter and generally bisects the width dimension. Each slit or slot opening 112, 114 are substantially the same length and are substantially parallel to one another.

As shown in FIG. 4B, the paired flat spring 100 is formed by lifting the stamped pattern 104 from the base sheet 102 in a perpendicular direction so as to define a pair of lower arcuate members 114, 116 and an upper arcuate member 118, wherein terminal ends 120, 122 of the two lower and one upper arcuate members are integral to one another. As in prior embodiments, the terminal ends 120, 122 are generally horizontally oriented relative to the base sheet 102. The lower arcuate members 114, 116 are integral to the base sheet 102 via the non-stamped portions 108, 110 at arc midpoints and the upper arcuate member 118 is inverted relative to the two lower arcuate members 114, 116. In this manner, application of a load to the pair flat spring 100 provides vertical displacement.

A process of manufacturing the chassis core generally includes providing a rigid or semi-rigid sheet; attaching a lower flat spring to the rigid or semi-rigid sheet, including a first terminal end, a second terminal end, and a flexible arcuate member extending from the first terminal end to the second terminal end; and attaching an upper flat spring to the lower flat spring, the upper flat spring comprising a first terminal end, a second terminal end, and a flexible arcuate member extending from the first terminal end to the second terminal end, wherein the first and second terminal ends are coupled to the first and second terminal ends of the lower flat spring. Attaching the upper flat spring to the lower flat spring can occur prior to or subsequent to attaching the lower flat spring to the rigid or semi-rigid sheet. Where more than one paired flat spring is attached to the rigid or semi-rigid sheet, the additional paired flat springs are arranged in rows and/or columns and are perpendicularly oriented relative to an adjacent paired flat spring as shown, or in other embodiments, oriented with a 30 to 90 degree offset relative to an adjacent paired flat spring. In some embodiments, the process may further include attaching an elastomeric member to an apex of two or more upper flat springs so as to provide additional stability of the pair flat springs and chassis core.

In another embodiment, the process for manufacturing the core chassis for a cushion includes providing a sheet; forming one or more lower flat springs in the sheet, each lower flat spring having first and second arcuate members extending from and continuously joined to the sheet with each arcuate portion having a terminal end; and attaching an upper flat spring to the lower flat spring, the upper flat spring comprising a first terminal end, a second terminal end, and a flexible arcuate member extending from the first terminal end to the second terminal end, wherein the first and second terminal ends are coupled to the terminal ends of the lower flat spring.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cushion comprising: a core chassis consisting of: a rigid or semi-rigid base sheet; and a single layer consisting of a plurality of paired flat springs spanning across and directly coupled to the rigid or semi-rigid base sheet, wherein each paired flat spring consists of a lower flat spring including a first terminal end, a second terminal end, and a flexible arcuate member extending from the first terminal end to the second terminal end, and an upper flat spring including a first terminal end, a second terminal end, and a flexible arcuate member extending from the first terminal end to the second terminal end, wherein the first and second terminal ends of the upper flat spring are fixedly attached to respective first and second terminal ends of the lower flat spring such that the upper flat spring is inverted relative to the lower flat spring, wherein the plurality of paired flat springs of the single layer are individually arranged, and wherein the lower flat springs of each one of the plurality of paired flat springs are directly coupled to the rigid or semi-rigid base sheet in columns and rows such that each of the paired flat springs is aligned at a 30 to 90 degree angle relative to an adjacent paired flat spring.

2. The cushion of claim 1, wherein the plurality of paired flat springs are arranged in rows and columns on the rigid or semi-rigid base sheet such that every other paired flat spring is orthogonal to an adjacent paired flat spring.

3. The cushion of claim 1, wherein the lower flat spring is fixedly attached to the rigid or semi-rigid base sheet at about a midpoint of the flexible arcuate member.

4. The cushion of claim 1, wherein the flexible arcuate members of the upper and lower flat springs has a parabolic shape.

5. The cushion of claim 1, wherein the flexible arcuate members of the upper and lower flat springs has an elliptical shape.

6. The cushion of claim 1, wherein an arrangement of the rows and columns define a mattress dimension corresponding to a standard, queen, king, or custom sized mattress.

7. The cushion of claim 1, wherein one of the plurality of paired flat springs and an adjacent paired flat spring further comprises an elastomeric member attached to an apex of the respective upper flat springs.

8. The cushion of claim 1, wherein the plurality of paired flat springs are formed of a molded plastic and a selected one or both of the upper and lower the flat springs has a variable thickness.

9. The cushion of claim 1, wherein a selected one or both of the upper and lower flat springs have a substantially rectangular cross section dimensionally varying from the first terminal end the second terminal end.

* * * * *